(12) United States Patent
Wegmann et al.

(10) Patent No.: US 8,569,405 B2
(45) Date of Patent: Oct. 29, 2013

(54) ADDITIVE MIXTURES FOR STYRENIC POLYMERS

(75) Inventors: Alex Wegmann, Allschwil (CH); Sunghee Kim, Gwangju (KR); Michèle Gerster, Binningen (CH)

(73) Assignee: BASF SE, Ludwigshafen (DE)

( * ) Notice: Subject to any disclaimer, the term of this patent is extended or adjusted under 35 U.S.C. 154(b) by 512 days.

(21) Appl. No.: 12/747,547

(22) PCT Filed: Jan. 19, 2009

(86) PCT No.: PCT/EP2009/050539
§ 371 (c)(1),
(2), (4) Date: Sep. 17, 2010

(87) PCT Pub. No.: WO2009/095328
PCT Pub. Date: Aug. 6, 2009

(65) Prior Publication Data
US 2011/0046278 A1    Feb. 24, 2011

(30) Foreign Application Priority Data

Jan. 28, 2008   (EP) .................................. 08150708

(51) Int. Cl.
*C08K 5/15*   (2006.01)
*C08K 5/1535* (2006.01)
*C07D 307/83* (2006.01)
*C08G 14/04*  (2006.01)

(52) U.S. Cl.
USPC ........... 524/111; 524/500; 524/507; 524/107; 549/304; 549/305

(58) Field of Classification Search
USPC .......... 524/111, 500, 540, 107; 549/304, 305
See application file for complete search history.

(56) References Cited

U.S. PATENT DOCUMENTS

| | | |
|---|---|---|
| 4,365,032 A | 12/1982 | Yosizato |
| 4,525,514 A | 6/1985 | Yachigo |
| 4,562,281 A | 12/1985 | Takahashi |
| 4,774,274 A | 9/1988 | Takata |
| 5,214,193 A | 5/1993 | Inoue |
| 5,516,920 A | 5/1996 | Nesvadba |
| 5,602,196 A | 2/1997 | Gilg |
| 5,616,780 A | 4/1997 | Pitteloud et al. |
| 6,060,545 A | 5/2000 | Gilg |
| 6,365,781 B2 | 4/2002 | Pizzoli |
| 2003/0088004 A1* | 5/2003 | Hoshi et al. ................... 524/287 |
| 2003/0109611 A1 | 6/2003 | Schrinner |
| 2004/0110882 A1* | 6/2004 | Krawinkel et al. ........... 524/334 |
| 2007/0257234 A1* | 11/2007 | Gerster et al. ................ 252/407 |

FOREIGN PATENT DOCUMENTS

| | | |
|---|---|---|
| EP | 0079806 A1 | 5/1983 |
| EP | 0500323 A2 | 8/1992 |
| EP | 0678550 A2 | 10/1995 |
| EP | 0716076 A2 | 6/1996 |
| EP | 0727410 A1 | 8/1996 |
| JP | 11/071489 A | 3/1999 |
| JP | 2003-003040 A | 1/2003 |
| WO | 01/18102 A1 | 3/2001 |
| WO | 2006/024610 A2 | 3/2006 |
| WO | 2006/024611 A2 | 3/2006 |

OTHER PUBLICATIONS

AN# 2003-336459 of JP 2003/003040.
Die Angewandte Makromolekulare Chemie, vol. 176, 1990.
English Language Abstract of EP 0678550 Printed on Sep. 16, 2010.
AN# 1999-248558 of JP 11/071489.

* cited by examiner

*Primary Examiner* — James Seidleck
*Assistant Examiner* — Deve E Valdez
(74) *Attorney, Agent, or Firm* — Tyler A. Stevenson

(57) ABSTRACT

The invention describes a process for reducing the amount of saturated or unsaturated monomers and oligomers during production and processing of styrenic polymers comprising a mixture of at least two components selected from the group consisting of a) phenol thioethers, b) phenol acrylates, c) 3-arylbenzofuran-2-ones and d) 1,1-di-substituted ethylenes or tri-substituted ethylenes.

20 Claims, No Drawings

ADDITIVE MIXTURES FOR STYRENIC POLYMERS

The present invention relates to a process for reducing the amount of saturated or unsaturated monomers and oligomers during production and processing of styrenic polymers comprising a mixture of at least two components selected from the group consisting of a) phenol thioethers, b) phenol acrylates, c) 3-arylbenzofuran-2-ones and d) 1,1-di-substituted ethylenes or tri-substituted ethylenes; to mixtures of at least two components; to compositions comprising a styrenic polymers and a mixture of at least two components; as well as the use thereof for reducing the amount of saturated or unsaturated monomers and oligomers during production and processing of styrenic polymers.

In radical polymerization of styrenic polymers the ability to remove monomers and oligomers completely by adaptation of the stripping process is limited, due to depolymerization of polystyrene and polystyrene copolymers at high temperatures and under high shear forces.

Additives, e.g. cyclic peroxides or Diels-Alder-Adducts, can act as styrene scavengers, reacting with already present styrene, however, they cannot avoid the continuous depolymerization of styrene polymers. This depolymerization leads to a reduction of the molecular weight, to a loss of mechanical strength of the polymer, and to the continuous formation of low molecular weight species, especially monomers, dimers, and trimers. Extremely high amounts of such styrene scavengers would be needed to react with the continuously formed styrene monomer/oligomers. In addition, these additives are also not useful to reduce the content of other low molecular weight species that can be present in styrenic polymers, for example butadiene, acrylonitrile or ethyl benzene.

Additives that can inhibit, or at least reduce the depolymerization reaction of styrenic polymers, are molecules that can react with C-radicals that are formed during the depolymerization of styrenic polymers, thus interrupting the degradation process. These include 3-arylbenzofuran-2-ones, phenol acrylates and phenol thioethers. Adding such additives before the stripping process, allows to remove the monomers/oligomers using severe conditions without risking to form monomers/oligomers again by depolymerization. Adding such additives in the compounding/processing step, avoids the formation of new monomer/oligomers due to depolymerization under high temperature and shear. Drawback of these products are that the reduction of monomers/oligomers is still insufficient for many applications, especially requiring food contact approval, and phenol acrylates increase the initial color of the polymer as well as reduce the thermal stability of the polymer.

It has now surprisingly been found that a mixture comprising of at least two components selected from the group consisting of a) phenol thioethers, b) phenol acrylates, c) 3-arylbenzofuran-2-ones and d) 1,1-di-substituted ethylenes or tri-substituted ethylenes shows a synergistic effect in reducing the amount of saturated or unsaturated monomes and oligomers, the efficiency is better than with either of the mentioned compound classes alone. Moreover, the color of the resulting polymer is much better than with phenol-acrylates alone.

The present invention accordingly relates to a process for reducing the amount of saturated or unsaturated monomers and oligomers during production and processing of styrenic polymers comprising a mixture of at least two components selected from the group consisting of a) phenol thioethers, b) phenol acrylates, c) 3-arylbenzofuran-2-ones and d) 1,1-di-substituted ethylenes or tri-substituted ethylenes.

Preferably, component a) is a compound of the formula I

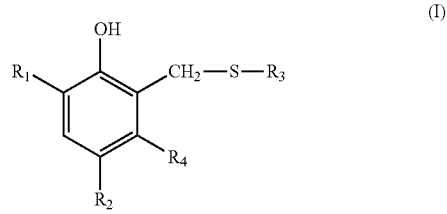

wherein
$R_1$ is hydrogen, $C_1$-$C_{20}$alkyl, styryl, α-methyl-styryl or —$CH_2$—S—$R_3$; or $C_1$-$C_{20}$alkyl substituted with $C_2$-$C_{20}$alkenyl, $C_3$-$C_{20}$alkinyl, $C_5$-$C_9$cycloalkyl, phenyl or tolyl;
$R_2$ is $C_1$-$C_{20}$alkyl or —$CH_2$—S—$R_3$,
$R_3$ is $C_1$-$C_{20}$alkyl; with phenyl, hydroxyl, cyano, formyl, acetyl or —O—CO—$R_5$ substituted $C_1$-$C_{20}$alkyl; $C_2$-$C_{20}$alkenyl, $C_3$-$C_{20}$alkinyl, $C_5$-$C_9$cycloalkyl; or with hydroxyl, phenyl, 4-chlorophenyl, 2-methoxycarbonylphenyl, p-tolyl, 1,3-benzthiazol-2-yl, —$(CHR_5)_n$COO$R_6$ or —$(CHR_5)_n$CON$R_7$$R_8$ substituted $C_5$-$C_9$cycloalkyl;
$R_4$ is hydrogen or methyl,
$R_5$ is hydrogen or $C_1$-$C_6$alkyl,
$R_6$ is $C_1$-$C_{20}$alkyl; with oxygen or sulfur interrupted $C_3$-$C_{20}$alkyl; $C_5$-$C_9$cycloalkyl, phenyl, benzyl or tolyl,
$R_7$ and $R_8$ are independently of each other hydrogen or $C_1$-$C_6$alkyl, and
n is 1 or 2.

Alkyl having up to 20 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

$C_2$-$C_{20}$alkenyl radicals are, for example, vinyl, allyl(prop-2-enyl), but-3-enyl, pent-4-enyl, hex-5-enyl, oct-7-enyl, dec-9-enyl or dodec-1'-enyl.

$C_3$-$C_{20}$alkinyl radicals are, for example, propargyl, but-3-inyl, hex-5-inyl, oct-7-inyl, dec-9-inyl, dodec-11-inyl, tetradec-13-inyl, hexadec-15-inyl, octadec-17-inyl or eicos-19-inyl.

$C_5$-$C_9$cycloalkyl radicals are, for example, cyclopentyl, cyclohexyl, cycloheptyl, cyclooctyl, cyclononyl, and in particular cyclohexyl.

$C_1$-$C_{20}$alkyl radicals substituted with phenyl are, for example, benzyl, phenethyl, α-methylbenzyl, α,α-dimethylbenzyl, phenylbutyl, phenyl-α,α-dimethylpropyl, phenylhexyl, phenyl-α,α-dimethylbutyl, phenyloctyl or phenyl-α,α-dimethylhexyl.

$C_1$-$C_{20}$alkyl radicals substituted by one or two hydroxyl groups are, for example, 2-hydroxyethyl, 2-hydroxypropyl, 2-hydroxybutyl, 2-hydroxyhexyl, 2-hydroxyoctyl, 2-hydroxydecyl, 2-hydroxydodecyl, 2-hydroxytetradecyl, 2-hydroxyhexadecyl, 2-hydroxyoctadecyl, 2-hydroxyeicosyl or 2,3-dihydroxypropyl.

$C_1$-$C_{20}$alkyl radicals substituted by phenyl and hydroxy are, for ex. 1-phenyl-2-hydroxyethyl.

$C_1$-$C_{20}$alkyl radicals substituted by cyano are, for example, 2-cyanoethyl.

$C_3$-$C_{20}$alkyl interrupted by one to five oxygen or sulfur are, for example, 3-oxapropyl, 3-thiapropyl, 3-oxabutyl, 3-thiabutyl, 3-oxapentyl, 3-thiapentyl, 3,6-dioxaheptyl, 3,6,9-trioxadecyl or 3,6,9,12,15,18 hexaoxanonadecyl.

Of interest is a compound of the formula I wherein $R_3$ is $C_6$-$C_{18}$alkyl.

Of special interest is a compound of the formula I, wherein
$R_1$ is methyl,
$R_2$ is —$CH_2$—S—$R_3$,
$R_3$ is $C_8$-$C_{12}$alkyl, and
$R_4$ is hydrogen.

Particular preference is given to Irganox 1520® and Irganox 1726® [available from Ciba Specialty Chemicals Inc.].

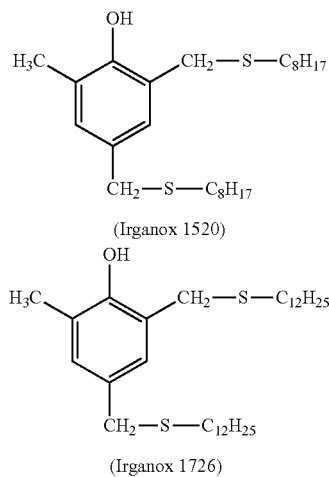

(Irganox 1520)

(Irganox 1726)

The preparation of the compounds of the formula I are disclosed for example in U.S. Pat. No. 6,365,781 B2 and can be prepared by methods known in the art as disclosed for example in the above mentioned reference.

Preferably, component b) is a compound of the formula II

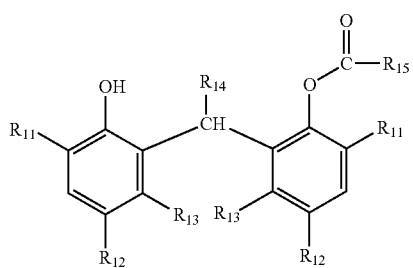

(II)

wherein
$R_{11}$ and $R_{12}$ are each independently of the other $C_1$-$C_{25}$alkyl; $C_5$-$C_{12}$cycloalkyl unsubstituted or substituted by $C_1$-$C_4$alkyl; $C_7$-$C_9$-phenylalkyl; or phenyl unsubstituted or substituted by $C_1$-$C_4$alkyl,
$R_{13}$ is hydrogen or methyl,
$R_{14}$ is hydrogen or $C_1$-$C_8$alkyl,
$R_{15}$ is $C_1$-$C_{25}$alkyl; $C_2$-$C_{25}$alkyl interrupted by oxygen, sulfur or

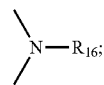

$C_2$-$C_{24}$alkenyl;
$C_8$-$C_{30}$phenylalkenyl unsubstituted or substituted on the phenyl ring by halogen, $C_1$-$C_4$alkyl, $C_1$-$C_4$alkoxy or $C_1$-$C_4$alkylthio; $C_5$-$C_{12}$cycloalkyl unsubstituted or substituted by $C_1$-$C_4$alkyl;
$C_8$-$C_{30}$phenylalkyl unsubstituted or substituted on the phenyl ring by halogen, $C_1$-$C_4$alkyl, $C_1$-$C_4$alkoxy or $C_1$-$C_4$alkylthio; or phenyl unsubstituted or substituted by halogen, $C_1$-$C_4$alkyl, $C_1$-$C_4$alkoxy or $C_1$-$C_4$alkylthio, and
$R_{16}$ is hydrogen or $C_1$-$C_{18}$alkyl.

Alkyl having up to and including 25 carbon atoms is a branched or unbranched radical, for example methyl, ethyl, propyl, isopropyl, n-butyl, sec-butyl, isobutyl, tert-butyl, 1,1-dimethyl-1-propyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred meanings of $R_{11}$ and $R_{12}$ is, for example, $C_1$-$C_{18}$alkyl, especially $C_1$-$C_{12}$alkyl, e.g. $C_1$-$C_8$alkyl. An especially preferred meaning of $R_{11}$ and $R_{12}$ is, for example, $C_1$-$C_6$alkyl, especially $C_1$-$C_5$alkyl, e.g. tert-butyl or 1,1-dimethyl-1-propyl, that is to say, tert-pentyl. A preferred meaning of $R_{15}$ is, for example, $C_1$-$C_{18}$alkyl, especially $C_1$-$C_{12}$alkyl. A preferred meaning of $R_{16}$ is, for example, $C_1$-$C_{12}$alkyl, especially $C_1$-$C_8$alkyl, e.g. $C_1$-$C_4$alkyl.

$C_5$-$C_{12}$Cycloalkyl unsubstituted or substituted by $C_1$-$C_4$alkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl, cyclooctyl, cyclononyl, cyclodecyl, cycloundecyl or cyclododecyl. A preferred meaning of $R_{11}$ and $R_{12}$ is, for example, $C_5$-$C_8$cycloalkyl unsubstituted or substituted by methyl, especially cyclohexyl unsubstituted or substituted by methyl, e.g. cyclohexyl or α-methylcyclohexyl. A preferred meaning of $R_{15}$ is, for example, $C_5$-$C_8$cycloalkyl, especially $C_5$-$C_6$cycloalkyl, e.g. cyclohexyl.

$C_7$-$C_9$-Phenylalkyl is, for example, benzyl, α-methylbenzyl, α,α-dimethylbenzyl or 2-phenylethyl. Benzyl and α-dimethylbenzyl are preferred.

Phenyl that is substituted by halogen, $C_1$-$C_4$alkyl, $C_1$-$C_4$alkoxy or $C_1$-$C_4$alkylthio and contains preferably from 1 to 3, especially 1 or 2, alkyl groups is, for example, o-, m- or p-methyl-phenyl, o-, m- or p-methoxyphenyl, o-, m- or p-chlorophenyl, o-, m- or p-methylthiophenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_2$-$C_{25}$Alkyl interrupted by oxygen, sulfur or

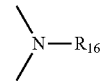

is, for example, $CH_3-O-CH_2-$, $CH_3-O-CH_2CH_2-$, $CH_3-S-CH_2-$, $CH_3-NH-CH_2-$, $CH_3-N(CH_3)-CH_2-$, $CH_3-O-CH_2CH_2-O-CH_2-$, $CH_3CH_2-O-CH_2CH_2-O-CH_2CH_2-$, $CH_3-(O-CH_2CH_2-)_2O-CH_2CH_2-$, $CH_3-(O-CH_2CH_2-)_3O-CH_2CH_2-$ or $CH_3-(O-CH_2CH_2-)_4O-CH_2CH_2-$.

Alkenyl having from 2 to 24 carbon atoms is a branched or unbranched radical, for example vinyl, propenyl, 2-butenyl, 3-butenyl, isobutenyl, n-2,4-pentadienyl, 3-methyl-2-butenyl, n-2-octenyl, n-2-dodecenyl, isododecenyl, oleyl, n-2-octadecenyl or n-4-octadecenyl. Alkenyl having from 2 to 18, especially from 2 to 10, carbon atoms, e.g. vinyl, is preferred.

$C_8$-$C_{30}$Phenylalkenyl unsubstituted or substituted on the phenyl ring by halogen, $C_1$-$C_4$alkyl, $C_1$-$C_4$alkoxy or $C_1$-$C_4$alkylthio is a branched or unbranched radical, for example styryl, 2-(p-methoxyphenyl)-1-ethenyl, 2-(p-chlorophenyl)-1-ethenyl, 2-(p-methylphenyl)-1-ethenyl, 2-(p-methylthiophenyl)-1-ethenyl, 2-phenyl-2-methyl-1-ethenyl, 3-phenyl-1-propenyl, 4-phenyl-1-butenyl, 5-phenyl-1-pentenyl, 6-phenyl-1-hexenyl, 7-phenyl-1-heptenyl or 8-phenyl-1-octenyl.

$C_8$-$C_{30}$Phenylalkyl unsubstituted or substituted on the phenyl ring by halogen, $C_1$-$C_4$alkyl, $C_1$-$C_4$alkoxy or $C_1$-$C_4$alkylthio is a branched or unbranched radical, for example phenylethyl, 2-(p-methoxyphenyl)-ethyl, 2-(p-chlorophenyl)-ethyl, 2-(p-methylphenyl)-ethyl, 2-(p-methylthiophenyl)-ethyl, 2-phenyl-2-methyl-ethyl, 3-phenylpropyl, 4-phenylbutyl, 5-phenylpentyl, 6-phenylhexyl, 7-phenylheptyl or 8-phenyloctyl.

Halogen is, for example, chlorine, bromine or iodine. Chlorine is preferred.

Preference is given to a compound of formula II wherein
$R_{11}$ and $R_{12}$ are each independently of the other $C_1$-$C_{18}$alkyl; $C_5$-$C_8$cycloalkyl unsubstituted or substituted by $C_1$-$C_4$alkyl; $C_7$-$C_9$-phenylalkyl; or phenyl,
$R_{13}$ is hydrogen or methyl,
$R_{14}$ is hydrogen or $C_1$-$C_8$alkyl,
$R_{15}$ is $C_1$-$C_{18}$alkyl; $C_2$-$C_{18}$alkyl interrupted by oxygen, sulfur or

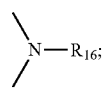

$C_2$-$C_{18}$alkenyl; $C_8$-$C_{18}$-phenylalkenyl unsubstituted or substituted on the phenyl ring by halogen, $C_1$-$C_4$alkyl, $C_1$-$C_4$alkoxy or $C_1$-$C_4$alkylthio; $C_5$-$C_{12}$cycloalkyl; $C_8$-$C_{18}$-phenylalkyl unsubstituted or substituted on the phenyl ring by halogen, $C_1$-$C_4$alkyl, $C_1$-$C_4$alkoxy or $C_1$-$C_4$alkylthio; or phenyl unsubstituted or substituted by chlorine, $C_1$-$C_4$alkyl or $C_1$-$C_4$alkoxy, and
$R_6$ is hydrogen or $C_1$-$C_{12}$alkyl.

Preference is given also to a compound of formula II wherein
$R_{11}$ and $R_{12}$ are each independently of the other $C_1$-$C_{12}$alkyl, $C_5$-$C_8$cycloalkyl, $C_7$-$C_9$-phenylalkyl or phenyl,
$R_{13}$ is hydrogen,
$R_{14}$ is hydrogen or $C_1$-$C_4$alkyl, and
$R_{15}$ is $C_1$-$C_{12}$alkyl; $C_2$-$C_{12}$alkyl interrupted by oxygen or sulfur; $C_2$-$C_{12}$alkenyl; $C_8$-$C_{10}$-phenylalkenyl unsubstituted or substituted on the phenyl ring by $C_1$-$C_4$alkyl or $C_1$-$C_4$alkoxy; $C_5$-$C_8$-cycloalkyl; $C_8$-$C_{18}$-phenylalkyl unsubstituted or substituted on the phenyl ring by chlorine, $C_1$-$C_4$alkyl or $C_1$-$C_4$alkoxy; or phenyl unsubstituted or substituted by chlorine, $C_1$-$C_4$alkyl or $C_1$-$C_4$alkoxy.

Preference is likewise given to a compound of formula II wherein
$R_{11}$ is $C_1$-$C_6$alkyl, cyclohexyl or phenyl,
$R_{12}$ is $C_1$-$C_6$alkyl, cyclohexyl or phenyl,
$R_{13}$ is hydrogen,
$R_{14}$ is hydrogen or methyl, and
$R_{15}$ is $C_1$-$C_{12}$alkyl; $C_2$-$C_{12}$alkyl interrupted by oxygen; $C_2$-$C_{10}$alkenyl; $C_8$-$C_{10}$-phenylalkenyl un-substituted or substituted on the phenyl ring by methoxy; cyclohexyl; or phenyl unsubstituted or substituted by chlorine or methoxy.

Of special interest are compounds of the formula II wherein
$R_{11}$ is tert-butyl or tert-pentyl,
$R_{12}$ is $C_1$-$C_5$alkyl,
$R_{13}$ is hydrogen,
$R_{14}$ is hydrogen or methyl, and
$R_{15}$ is vinyl.

Also of special interest are compounds of the formula II according to Table 1.

TABLE 1

Compounds of the formula II

| No. | $R_{11}$ | $R_{12}$ | $R_{13}$ | $R_{14}$ | $R_{15}$ |
|---|---|---|---|---|---|
| 101 | tert-butyl | methyl | H | H | $CH_2=CH-$ |
| 102 | tert-pentyl | tert-pentyl | H | methyl | $CH_2=CH-$ |
| 103 | tert-butyl | tert-butyl | H | methyl | $CH_2=CH-$ |
| 104 | tert-butyl | methyl | H | methyl | $CH_2=CH-$ |
| 105 | tert-butyl | tert-butyl | H | methyl | methyl |
| 106 | tert-butyl | tert-butyl | H | methyl | ethyl |
| 107 | tert-butyl | tert-butyl | H | methyl | n-propyl |
| 108 | tert-butyl | tert-butyl | H | methyl | n-butyl |
| 109 | tert-butyl | tert-butyl | H | methyl | n-pentyl |
| 110 | tert-butyl | tert-butyl | H | methyl | n-hexyl |
| 111 | tert-butyl | tert-butyl | H | methyl | n-heptyl |
| 112 | tert-butyl | tert-butyl | H | methyl | n-octyl |
| 113 | tert-butyl | tert-butyl | H | methyl | n-nonyl |
| 114 | tert-butyl | tert-butyl | H | methyl | n-decyl |
| 115 | tert-butyl | tert-butyl | H | methyl | n-undecyl |
| 116 | tert-butyl | tert-butyl | H | methyl | $CH_3(CH_2)_3CH(CH_2CH_3)-$ |
| 117 | tert-butyl | tert-butyl | H | methyl | $CH_3CH=CH-$ |
| 118 | tert-butyl | tert-butyl | H | methyl | $CH_2=CH(CH_2)_8-$ |

TABLE 1-continued

Compounds of the formula II

| No. | $R_{11}$ | $R_{12}$ | $R_{13}$ | $R_{14}$ | $R_{15}$ |
|---|---|---|---|---|---|
| 119 | tert-butyl | tert-butyl | H | methyl | phenyl-CH=CH— |
| 120 | tert-butyl | tert-butyl | H | methyl | p-methoxyphenyl-CH=CH— |
| 121 | tert-butyl | tert-butyl | H | methyl | o-chlorophenyl- |
| 122 | tert-butyl | tert-butyl | H | methyl | p-methoxyphenyl- |

Of particular interest are compound (101) or (102).

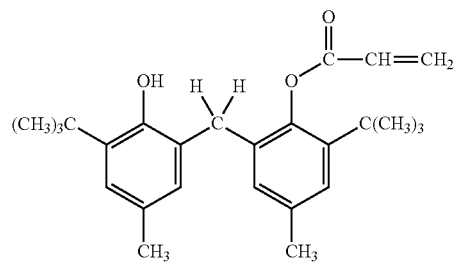
(101)

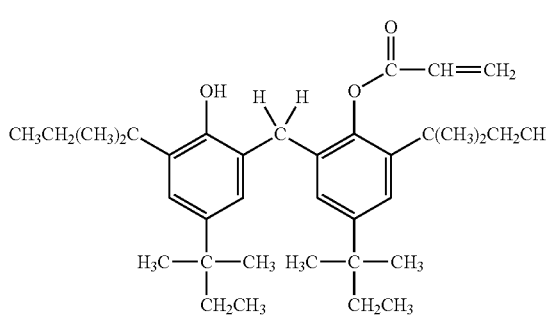
(102)

Some of the compounds of formula II are known from the literature or can be prepared analogously to the processes disclosed in the following literature sources: U.S. Pat. No. 4,365,032; EP-A-0 079 806; U.S. Pat. No. 4,562,281; U.S. Pat. No. 4,774,274; EP-A-0 500 323; U.S. Pat. No. 5,602,196; EP-A-0 716 076; U.S. Pat. No. 5,616,780 and EP-A-0 727 410.

Compound (101) is available commercially under the name Irganox 3052 (RTM; Ciba Inc.) or Sumilizer®GM (RTM; Sumitomo); compound (102) is available commercially under the name Sumilizer®GS (RTM; Sumitomo).

Preferably, component c) is a compound of the formula III

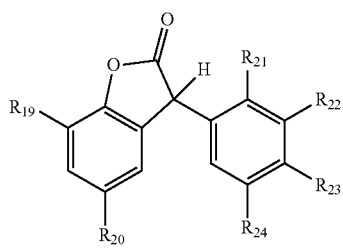
(III)

wherein
$R_{19}$ is hydrogen or $C_1$-$C_8$alkyl,
$R_{20}$ is $C_1$-$C_{12}$alkyl,
$R_{21}$ is hydrogen, $C_1$-$C_4$alkyl or $C_2$-$C_8$alkanoyl,
$R_{22}$ is hydrogen or $C_1$-$C_8$alkyl; or $R_{21}$ and $R_{22}$ or $R_{22}$ and $R_{23}$ together with the carbon atoms to which they are attached form a $C_6$-$C_8$cycloalkylene ring,
$R_{23}$ is hydrogen, $C_1$-$C_4$alkyl or $C_1$-$C_4$alkoxy, and
$R_{24}$ is hydrogen or $C_1$-$C_{12}$alkyl.

$C_2$-$C_8$alkanoyl is for example acetyl, propionyl, butanoyl, pentanoyl, hexanoyl, heptanoyl or octanoyl. Acetyl is preferred.

Especially preferred benzofuran-2-one stabilizers are for example 5,7-di-tert-butyl-3-phenylbenzofuran-2-one; 5,7-di-tert-butyl-3-(3,4-dimethylphenyl)-benzofuran-2-one; 5,7-di-tert-butyl-3-(2,3-dimethylphenyl)-benzofuran-2-one, 5,7-d ktert-butyl-3-(4-methoxyphenyl)-benzofuran-2-one, 5-tert-octyl-3-(2-acetyl-5-tert-octylphenyl)-benzofuran-2-one or a compound of the formula B-1 or B-2 or mixtures thereof.

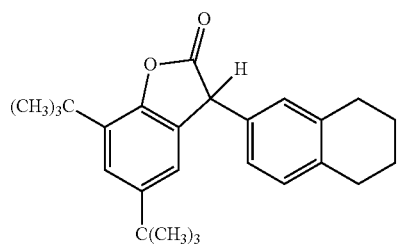
(B-1)

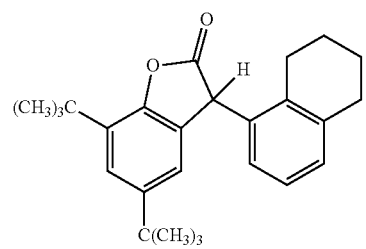
(B-2)

The benzofuran-2-one stabilizers of the formula III are known in the literature and disclosed for example in U.S. Pat. No. 5,516,920.

Preferably, component d) is a compound of the formula IV

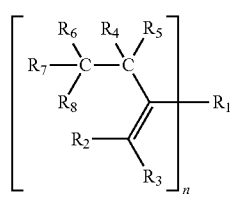
(IV)

in which, if n is 1, $R_1$ is

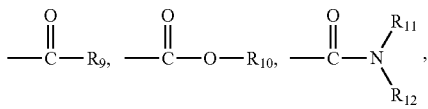

$-SOR_{10}$, $-SO_2R_{10}$, or $-CN$; or $R_1$ and $R_3$ form together

and
if n is 2,
$R_1$ is

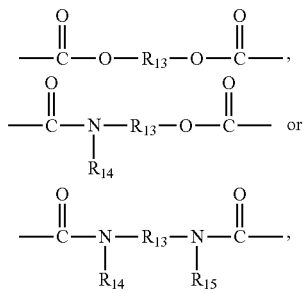

$R_2$ and $R_3$ independently of one another are hydrogen, $C_1$-$C_4$alkyl,

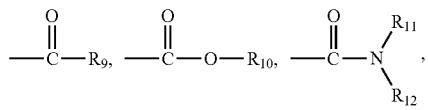

$-SOR_{10}$, $-SO_2R_{10}$, or $-CN$, with the proviso that at least one of
$R_2$ or $R_3$ is hydrogen;
$R_4$ and $R_5$ independently of one another are hydrogen or $C_1$-$C_{25}$alkyl,
$R_6$, $R_7$ and $R_8$ independently of one another are hydrogen, $C_1$-$C_{25}$alkyl,

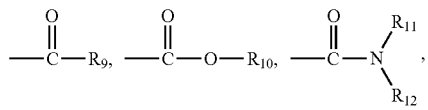

$-SOR_{10}$, $-SO_2R_{10}$, $-CN$,

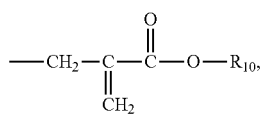

unsubstituted or $C_1$-$C_4$alkyl-substituted phenyl; or two of the radicals $R_6$, $R_7$ or $R_8$ form together with the carbon atom to which they are attached a radical of the formula Ia, Ib or Ic (Ia)
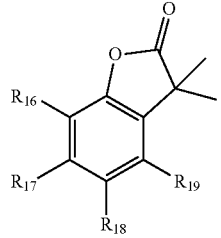

(Ib)
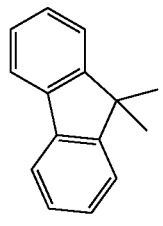

(Ic)
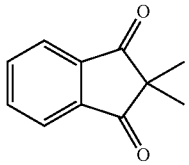

with the proviso that at least two of the radicals $R_6$, $R_7$ and $R_8$ are different from hydrogen,
$R_9$ is hydrogen, $C_1$-$C_{25}$alkyl, $C_7$-$C_9$-phenylalkyl, unsubstituted or $C_1$-$C_4$alkyl-substituted phenyl; unsubstituted or $C_1$-$C_4$alkyl-substituted $C_5$-$C_8$cycloalkyl;
$R_{10}$ is hydrogen, $C_1$-$C_{25}$alkyl, $C_7$-$C_9$-phenylalkyl, unsubstituted or $C_1$-$C_4$alkyl-substituted phenyl; unsubstituted or $C_1$-$C_4$alkyl-substituted $C_5$-$C_8$cycloalkyl; or $C_3$-$C_{25}$alkyl which is interrupted by oxygen or sulfur;
$R_{11}$ and $R_{12}$ independently of one another are hydrogen, $C_1$-$C_{25}$alkyl, $C_7$-$C_9$-phenylalkyl, unsubstituted or $C_1$-$C_4$alkyl-substituted phenyl; or $R_{11}$ and $R_{12}$, together with the nitrogen atom to which they are attached, form a 5-, 6- or 7-membered heterocyclic ring which is unsubstituted or is substituted by $C_1$-$C_4$alkyl or is interrupted by oxygen, sulfur or

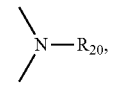

$R_{13}$ is $C_2$-$C_{18}$alkylene, $C_4$-$C_{18}$alkylene which is interrupted by oxygen, sulfur or

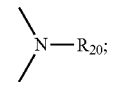

$C_2$-$C_{18}$alkenylene, $C_2$-$C_{20}$alkylidene, $C_7$-$C_{20}$phenylalkylidene, $C_5$-$C_8$cycloalkylene, $C_7$-$C_8$bi-cycloalkylene, unsubstituted or $C_1$-$C_4$alkyl-substituted phenylene;

$R_{14}$ and $R_{15}$ independently of one another are hydrogen or $C_1$-$C_8$alkyl, $R_{16}$, $R_{17}$, $R_{18}$ and $R_{19}$ are each independently of one another hydrogen, chloro, hydroxyl, $C_1$-$C_{25}$alkyl, $C_7$-$C_9$phenylalkyl, unsubstituted or $C_1$-$C_4$alkyl-substituted phenyl; unsubstituted or $C_1$-$C_4$alkyl-substituted $C_5$-$C_8$cycloalkyl; $C_1$-$C_{18}$alkoxy, $C_1$-$C_{18}$alkylthio, $C_1$-$C_4$alkylamino, di($C_1$-$C_4$alkyl)amino, $C_1$-$C_{25}$alkanoyloxy, $C_1$-$C_{25}$alkanoylamino, $C_3$-$C_{25}$alkenoyloxy, $C_3$-$C_{25}$alkanoyloxy which is interrupted by oxygen, sulfur or

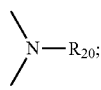

$C_6$-$C_9$cycloalkylcarbonyloxy, benzoyloxy or $C_1$-$C_{12}$alkyl-substituted benzoyloxy; or each pair of substituents $R_{16}$ and $R_{17}$ or $R_{17}$ and $R_{18}$ or $R_{18}$ and $R_{19}$ together with the linking carbon atoms, forms a benzene ring;

$R_{20}$ is hydrogen, $C_1$-$C_8$alkyl or benzyl, and n is 1 or 2.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl.

$C_1$-$C_4$Alkyl-substituted phenyl, which preferably contains 1 to 3, especially 1 or 2 alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_7$-$C_9$-Phenylalkyl is, for example, benzyl, α-methylbenzyl, α,α-dimethylbenzyl or 2-phenylethyl.

Unsubstituted or $C_1$-$C_4$alkyl-substituted $C_5$-$C_8$cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl. Preference is given to cyclohexyl and tert-butylcyclohexyl.

$C_3$-$C_{25}$Alkyl interrupted by oxygen or sulfur is, for example, $CH_3$—O—$CH_2CH_2$—, $CH_3$—S—$CH_2CH_2$—, $CH_3$—O—$CH_2CH_2$—O—$CH_2CH_2$—, $CH_3$—(O—$CH_2CH_2$—)$_2$O—$CH_2CH_2$—, $CH_3$—(O—$CH_2CH_2$—)$_3$O—$CH_2CH_2$— or $CH_3$—(O—$CH_2CH_2$—)$_4$O—$CH_2CH_2$—.

Where $R_{11}$ and $R_{12}$ together with the nitrogen atom to which they are attached, form a 5-, 6- or 7-membered heterocyclic ring which is unsubstituted or is substituted by $C_1$-$C_4$alkyl or is interrupted by oxygen, sulfur or

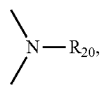

this denotes, for example, the following radicals:

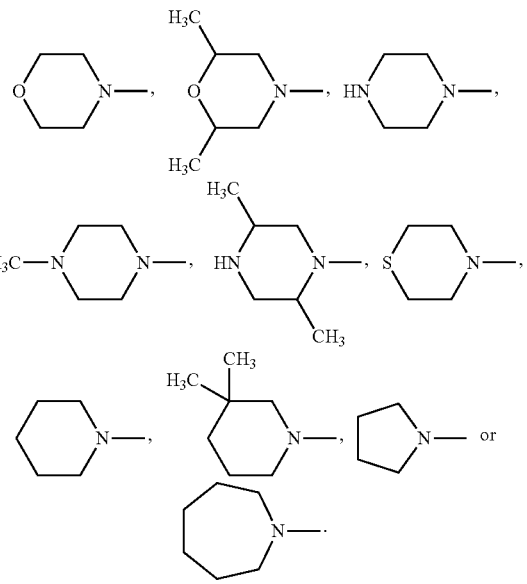

$R_{11}$ and $R_{12}$ preferably form with the nitrogen atom to which they are attached, a 6-membered heterocyclic ring interrupted by oxygen, such as, for example,

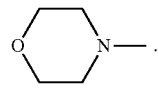

$C_2$-$C_{18}$Alkylene is a branched or unbranched radical, for example ethylene, propylene, trimethylene, tetramethylene, pentamethylene, hexamethylene, heptamethylene, octamethylene, decamethylene, dodecamethylene or octadecamethylene.

$C_4$-$C_{18}$Alkylene which is interrupted by oxygen, sulfur or

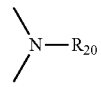

is, for example, —$CH_2CH_2$—O—$CH_2CH_2$—, —$CH_2CH_2$—S—$CH_2CH_2$—, —$CH_2CH_2$—NH—$CH_2CH_2$—, —$CH_2CH_2$—N($CH_3$)—$CH_2CH_2$—, —$CH_2CH_2$—O—$CH_2CH_2$—O—$CH_2CH_2$—, —$CH_2CH2$-(O—$CH_2CH_2$—)$_2$O—$CH_2CH_2$—, —$CH_2CH_2$—(O—$CH_2CH_2$—)$_3$O—$CH_2CH_2$—, —$CH_2CH_2$—(O—$CH_2CH_2$—)$_4$O—$CH_2CH_2$— or —$CH_2CH_2$—S—$CH_2CH_2$.

$C_2$-$C_{18}$Alkenylene is, for example, vinylene, methylvinylene, octenylethylene or dodecenylethylene. Preference is given to $C_2$-$C_8$alkenylene.

Alkylidene having 2 to 20 carbon atoms is, for example, ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. Preference is given to $C_2$-$C_8$alkylidene.

Phenylalkylidene having 7 to 20 carbon atoms is, for example, benzylidene, 2-phenylethylidene or 1-phenyl-2-hexylidene. Preference is given to $C_7$-$C_9$phenylalkylidene.

$C_5$-$C_8$Cycloalkylene is a saturated hydrocarbon group having two free valencies and at least one ring unit and is, for example, cyclopentylene, cyclohexylene, cycloheptylene or cyclooctylene. Preference is given to cyclohexylene.

$C_7$-$C_8$Bicycloalkylene is, for example, bicycloheptylene or bicyclooctylene.

Unsubstituted or $C_1$-$C_4$alkyl-substituted phenylene is, for example, 1,2-, 1,3-, 1,4-phenylene. 1,4-Phenylene is preferred.

Alkoxy having up to 18 carbon atoms is a branched or unbranched radical, for example methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. Preference is given to alkoxy having 1 to 12, especially 1 to 8, for example 1 to 6 carbon atoms.

Alkylthio having up to 18 carbon atoms is a branched or unbranched radical, for example methylthio, ethylthio, propylthio, isopropylthio, n-butylthio, isobutylthio, pentylthio, isopentylthio, hexylthio, heptylthio, octylthio, decylthio, tetradecylthio, hexadecylthio or octadecylthio. Preference is given to alkylthio having 1 to 12, especially 1 to 8, for example 1 to 6 carbon atoms.

Alkylamino having up to 4 carbon atoms is a branched or unbranched radical, for example methylamino, ethylamino, propylamino, isopropylamino, n-butylamino, isobutylamino or tert-butylamino.

Di($C_1$-$C_4$alkyl)amino also means that the two radicals independently of one another are branched or unbranched, for example dimethylamino, methylethylamino, diethylamino, methyl-n-propylamino, methylisopropylamino, methyl-n-butylamino, methylisobutylamino, ethylisopropylamino, ethyl-n-butylamino, ethylisobutylamino, ethyl-tert-butylamino, diethylamino, diisopropylamino, isopropyl-n-butylamino, isopropylisobutylamino, di-n-butylamino or diisobutylamino.

Alkanoyloxy having up to 25 carbon atoms is a branched or unbranched radical, for example formyloxy, acetoxy, propionyloxy, butanoyloxy, pentanoyloxy, hexanoyloxy, heptanoyloxy, octanoyloxy, nonanoyloxy, decanoyloxy, undecanoyloxy, dodecanoyloxy, tridecanoyloxy, tetradecanoyloxy, pentadecanoyloxy, hexadecanoyloxy, heptadecanoyloxy, octadecanoyloxy, eicosanoyloxy or docosanoyloxy. Preference is given to alkanoyloxy having 2 to 18, especially 2 to 12, for example 2 to 6 carbon atoms. Particular preference is given to acetoxy.

Alkanoylamino having up to 25 carbon atoms is a branched or unbranched radical, for example formylamino, acetylamino, propionylamino, butanoylamino, pentanoylamino, hexanoylamino, heptanoylamino, octanoylamino, nonanoylamino, decanoylamino, undecanoylamino, dodecanoylamino, tridecanoylamino, tetradecanoylamino, pentadecanoylamino, hexadecanoylamino, heptadecanoylamino, octadecanoylamino, eicosanoylamino or docosanoylamino. Preference is given to alkanoylamino having 2 to 18, especially 2 to 12, for example 2 to 6 carbon atoms.

Alkenoyloxy having 3 to 25 carbon atoms is a branched or unbranched radical, for example propenoyloxy, 2-butenoyloxy, 3-butenoyloxy, isobutenoyloxy, n-2,4-pentadienoyloxy, 3-methyl-2-butenoyloxy, n-2-octenoyloxy, n-2-dodecenoyloxy, iso-dodecenoyloxy, oleoyloxy, n-2-octadecenoyloxy or n-4-octadecenoyloxy. Preference is given to alkenoyloxy having 3 to 18, especially 3 to 12, for example 3 to 6, in particular 3 to 4 carbon atoms.

$C_3$-$C_{25}$Alkanoyloxy which is interrupted by oxygen, sulfur or

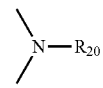

is, for example, $CH_3$—O—$CH_2$COO—, $CH_3$—S—$CH_2$COO—, $CH_3$—NH—$CH_2$COO—, $CH_3$—N($CH_3$)—$CH_2$COO—, $CH_3$—O—$CH_2CH_2$—O—$CH_2$COO—, $CH_3$—(O—$CH_2CH_2$—$)_2$O—$CH_2$COO—, $CH_3$—(O—$CH_2CH_2$—$)_3$O—$CH_2$COO— or $CH_3$—(O—$CH_2CH_2$—$)_4$O—$CH_2$COO—.

$C_6$-$C_9$cycloalkylcarbonyloxy is, for example, cyclohexylcarbonyloxy, cycloheptylcarbonyloxy or cyclooctylcarbonyloxy. Cyclohexylcarbonyloxy is preferred.

$C_1$-$C_{12}$Alkyl-substituted benzoyloxy, which preferably carries 1 to 3, especially 1 or 2 alkyl groups, is, for example, o-, m- or p-methylbenzoyloxy, 2,3-dimethylbenzoyloxy, 2,4-dimethylbenzoyloxy, 2,5-dimethylbenzoyloxy, 2,6-dimethylbenzoyloxy, 3,4-dimethyl benzoyloxy, 3,5-dimethylbenzoyloxy, 2-methyl-6-ethylbenzoyloxy, 4-tert-butylbenzoyloxy, 2-ethyl-benzoyloxy, 2,4,6-trimethylbenzoyloxy, 2,6-dimethyl-4-tert-butylbenzoyloxy or 3,5-di-tert-butylbenzoyloxy. Preferred substituents are $C_1$-$C_6$alkyl, especially $C_1$-$C_4$alkyl.

The compounds of the formula IV are disclosed in WO-A-06/024610.

Of special interest are compounds (101)-(121) according to Table 2 as examples for compounds of the formula IV.

TABLE 2

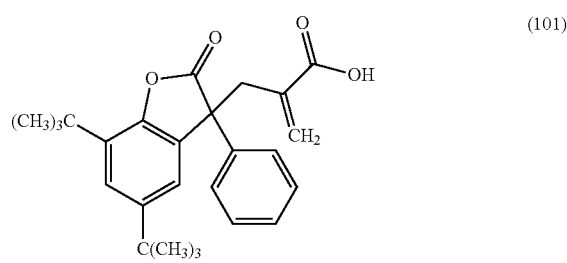

(101)

TABLE 2-continued
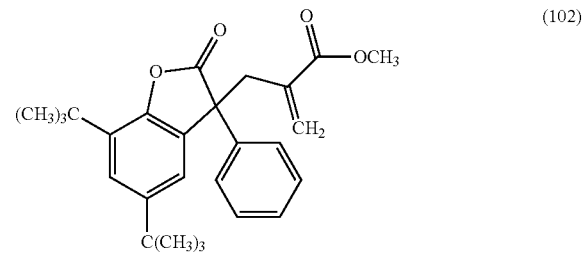
(102)
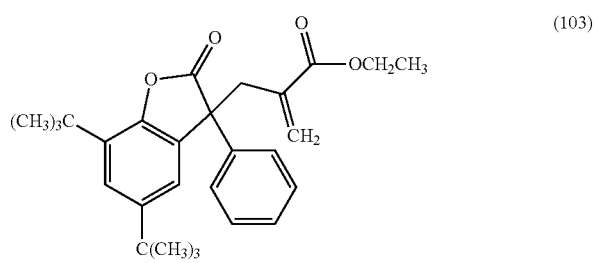
(103)
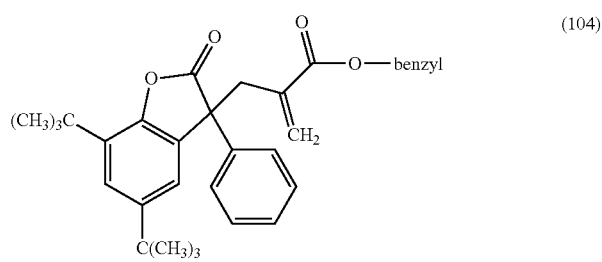
(104)
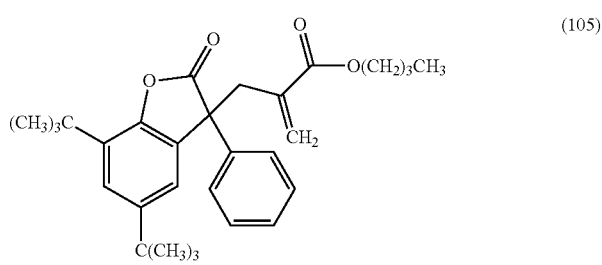
(105)
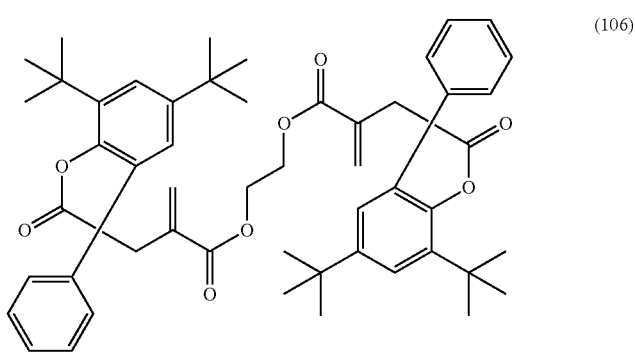
(106)

TABLE 2-continued
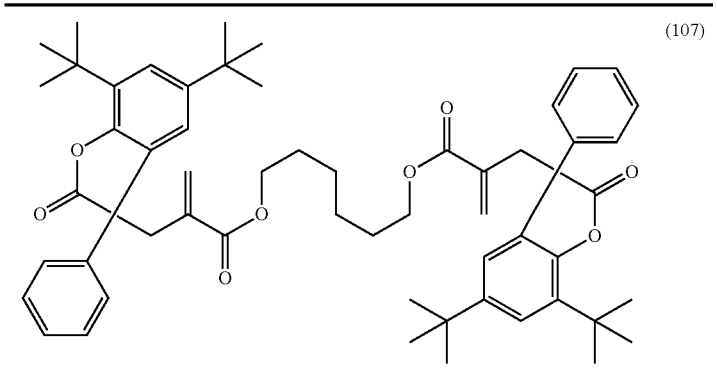
(107)
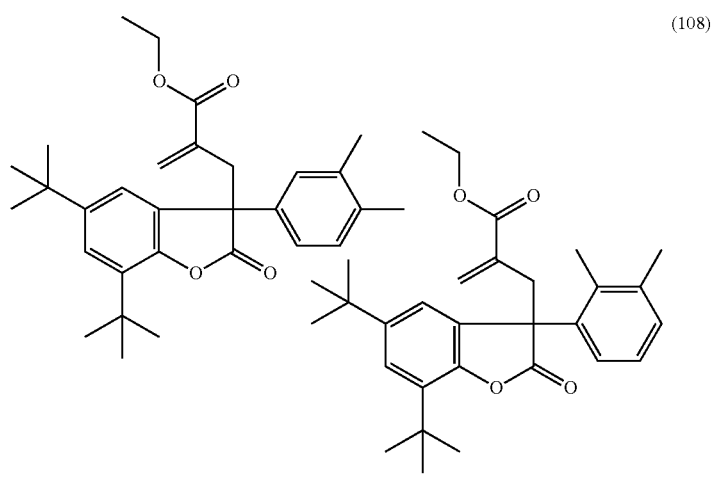
(108)
(mixture)
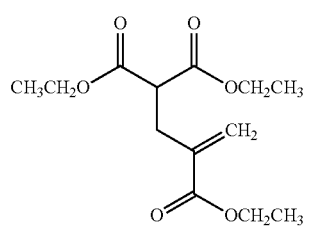
(109)
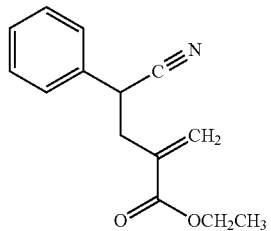 [SMILES: C=C(CC(C#N)c1ccccc1)C(=O)OCC]
(110)
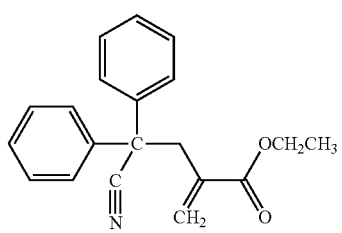 [SMILES: C=C(CC(C#N)(c1ccccc1)c1ccccc1)C(=O)OCC]
(111)

TABLE 2-continued
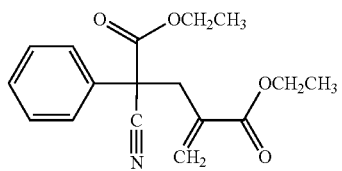 (112)
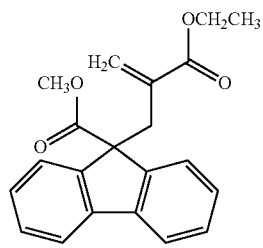 (113)
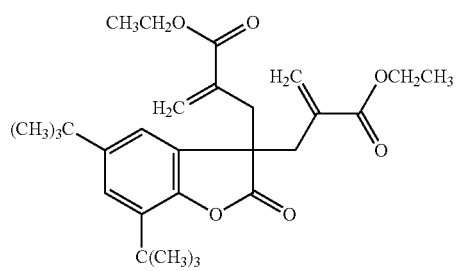 (114)
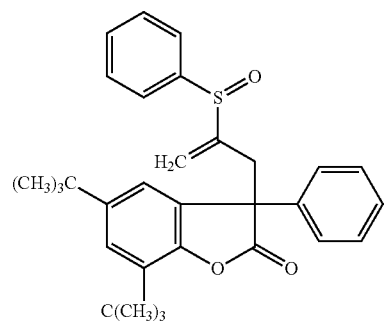 [SMILES: C=C(CC1(c2ccccc2)C(=O)Oc2c(C(C)(C)C)cc(C(C)(C)C)cc21)S(=O)c1ccccc1] (115)
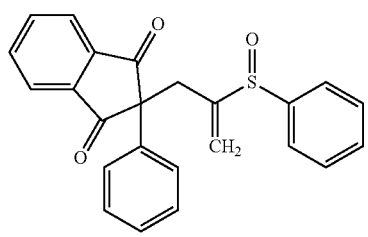 [SMILES: C=C(CC1(c2ccccc2)C(=O)c2ccccc2C1=O)S(=O)c1ccccc1] (116)
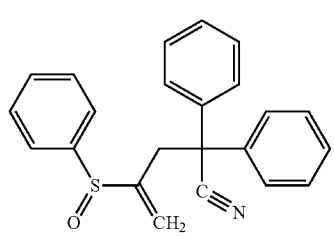 [SMILES: C=C(CC(C#N)(c1ccccc1)c1ccccc1)S(=O)c1ccccc1] (117)

TABLE 2-continued
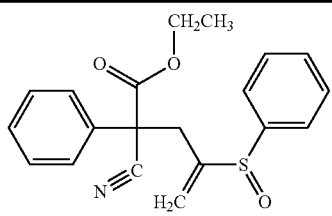
(118)
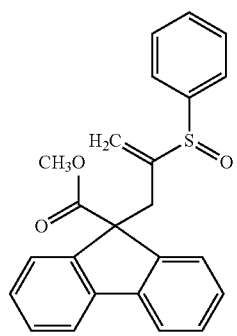
(119)
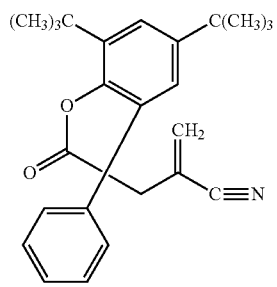 [SMILES: C=C(C#N)CCC(=O)Oc1c(-c2ccccc2)cc(C(C)(C)C)cc1C(C)(C)C]
(120)
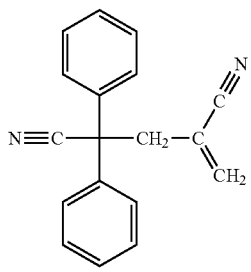 [SMILES: C=C(C#N)CC(C#N)(c1ccccc1)c1ccccc1]
(121)
Preferably, component d) is also a compound of the formula V
$$\underset{H}{\overset{R_0}{\vphantom{|}}}C=C\underset{R_2}{\overset{R_1}{\vphantom{|}}} \quad (V)$$
wherein
$R_0$ is
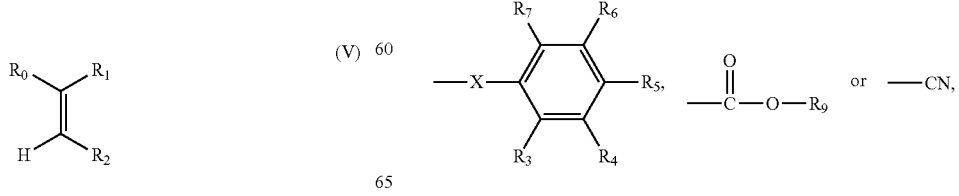

$R_1$ is

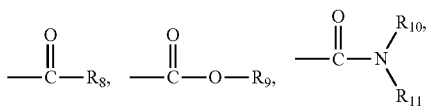

—S—$R_{12}$, —SO—$R_{12}$, —SO$_2$—$R_{12}$ or —CN; or $R_1$ and $R_2$ form together

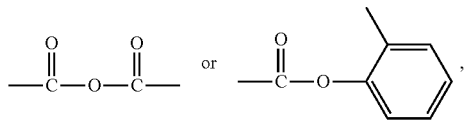

$R_2$ is hydrogen, —S—$R_{13}$, —SO—$R_{13}$, —SO$_2$—$R_{13}$, unsubstituted or $C_1$-$C_4$alkyl substituted phenyl;

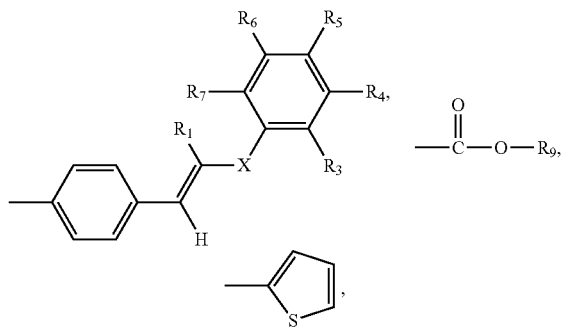

hydroxy or $C_1$-$C_{25}$alkanoyloxy, $R_3$, $R_4$, $R_5$, $R_6$ and $R_7$ independently of each other is hydrogen, $C_1$-$C_{25}$alkyl, halogen, trifluormethyl, nitro, $C_1$-$C_{25}$alkoxy,

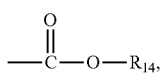

$C_7$-$C_9$-phenylalkyl, phenyl or

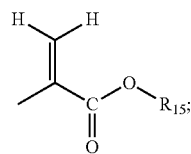

or each pair of substituent $R_3$ and $R_4$ or $R_4$ and $R_5$ or $R_5$ and $R_6$ or $R_6$ and $R_7$, together with the linking carbon atoms, forms a benzene ring; and with the proviso that at least one of the radicals from the group of $R_3$ to $R_7$ is hydrogen;

$R_8$ is hydrogen, $C_1$-$C_{25}$alkyl, $C_7$-$C_9$-phenylalkyl, unsubstituted or $C_1$-$C_4$alkyl-substituted phenyl; unsubstituted or $C_1$-$C_4$alkyl-substituted $C_5$-$C_8$cycloalkyl;

$R_9$ is hydrogen, alkali metal, $C_1$-$C_{25}$alkyl, $C_7$-$C_9$-phenylalkyl, unsubstituted or $C_1$-$C_4$alkyl-substituted phenyl; unsubstituted or $C_1$-$C_4$alkyl-substituted $C_5$-$C_8$cycloalkyl; $C_3$-$C_{25}$alkyl which is interrupted by oxygen or sulfur;

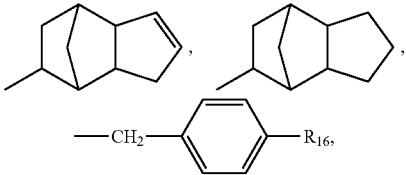

—CH$_2$— 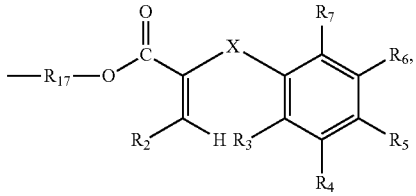

benzhydryl or $R_{10}$ and $R_{11}$ independently of one another are hydrogen, $C_1$-$C_{25}$alkyl, $C_7$-$C_9$-phenylalkyl, unsubstituted or $C_1$-$C_4$alkyl-substituted phenyl; unsubstituted or $C_1$-$C_4$alkyl-substituted $C_5$-$C_8$cycloalkyl; or $R_{10}$ and $R_{11}$, together with the nitrogen atom to which they are attached, form a 5-, 6- or 7-membered heterocyclic ring which is unsubstituted or is substituted by $C_1$-$C_4$alkyl or is interrupted by oxygen, sulfur or

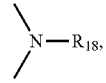

$R_{12}$ is hydrogen, $C_1$-$C_{25}$alkyl, $C_7$-$C_9$-phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{13}$ is hydrogen, $C_1$-$C_{25}$alkyl, $C_7$-$C_9$-phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{14}$ is $C_1$-$C_{25}$alkyl, $C_7$-$C_9$-phenylalkyl, unsubstituted or $C_1$-$C_4$alkyl-substituted phenyl; or unsubstituted or $C_1$-$C_4$alkyl-substituted $C_5$-$C_8$cycloalkyl;

$R_{15}$ is $C_1$-$C_{25}$alkyl or $C_7$-$C_9$-phenylalkyl, $R_{16}$ is

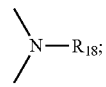

halogen or nitro, $R_{17}$ is $C_2$-$C_{18}$alkylene, $C_4$-$C_{18}$alkylene which is interrupted by oxygen, sulfur or

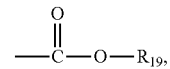

$C_2$-$C_{18}$alkenylene, $C_2$-$C_{20}$alkylidene, $C_7$-$C_{20}$phenylalkylidene, $C_5$-$C_8$cycloalkylene, $C_7$-$C_8$bicycloalkylene, unsubstituted or $C_1$-$C_4$alkyl-substituted phenylene;

$R_{18}$ is hydrogen, $C_1$-$C_8$alkyl or benzyl, $R_{19}$ is $C_1$-$C_{25}$alkyl or $C_7$-$C_9$-phenylalkyl, and X is a direct bond, —SO— or —SO$_2$—.

$C_1$-$C_4$Alkyl-substituted phenyl, which preferably contains 1 to 3, especially 1 or 2 alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl.

Halogen substituents are for example fluoro, chloro, bromo or iodo. Chloro is preferred.

Alkoxy having up to 15 carbon atoms is a branched or unbranched radical, for example methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. Preference is given to alkoxy having 1 to 18, especially 1 to 12, for example 1 to 6 carbon atoms.

$C_7$-$C_9$-Phenylalkyl is, for example, benzyl, α-methylbenzyl, α,α-dimethylbenzyl or 2-phenylethyl.

Unsubstituted or $C_1$-$C_4$alkyl-substituted $C_5$-$C_8$cycloalkyl is, for example, cyclopentyl, methylcyclopentyl, dimethylcyclopentyl, cyclohexyl, methylcyclohexyl, dimethylcyclohexyl, trimethylcyclohexyl, tert-butylcyclohexyl, cycloheptyl or cyclooctyl. Preference is given to cyclohexyl and tert-butylcyclohexyl.

$C_3$-$C_{25}$Alkyl interrupted by oxygen or sulfur is, for example, CH$_3$—O—CH$_2$CH$_2$—, CH$_3$—S—CH$_2$CH$_2$—, CH$_3$—O—CH$_2$CH$_2$—O—CH$_2$CH$_2$—, CH$_3$—(O—CH$_2$CH$_2$—)$_2$O—CH$_2$CH$_2$—, CH$_3$—(O—CH$_2$CH$_2$—)$_3$O—CH$_2$CH$_2$— or CH$_3$—(O—CH$_2$CH$_2$—)$_4$O—CH$_2$CH$_2$—.

Where $R_{10}$ and $R_{11}$ together with the nitrogen atom to which they are attached, form a 5-, 6- or 7-membered heterocyclic ring which is unsubstituted or is substituted by $C_1$-$C_4$alkyl or is interrupted by oxygen, sulfur or

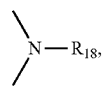

this denotes, for example, the following radicals:

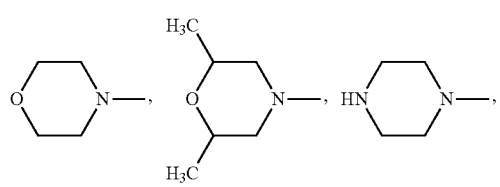

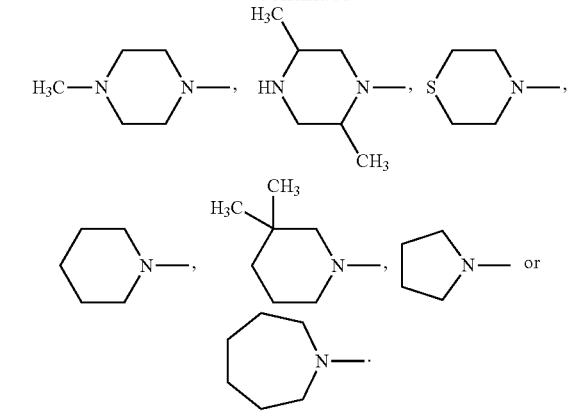

$R_{10}$ and $R_{11}$ preferably form with the nitrogen atom to which they are attached, a 5- or 6-membered heterocyclic ring.

$C_2$-$C_{18}$Alkylene is a branched or unbranched radical, for example ethylene, propylene, trimethylene, tetramethylene, pentamethylene, hexamethylene, heptamethylene, octamethylene, decamethylene, dodecamethylene or octadecamethylene.

$C_4$-$C_{18}$Alkylene which is interrupted by oxygen, sulfur or

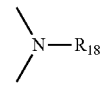

is, for example, —CH$_2$CH$_2$—O—CH$_2$CH$_2$—, —CH$_2$CH$_2$—S—CH$_2$CH$_2$—, —CH$_2$CH$_2$—NH—CH$_2$CH$_2$—, —CH$_2$CH$_2$—N(CH$_3$)—CH$_2$CH$_2$—, —CH$_2$CH$_2$—O—CH$_2$CH$_2$—O—CH$_2$CH$_2$—, —CH$_2$CH2-(O—CH$_2$CH$_2$—)$_2$O—CH$_2$CH$_2$—, —CH$_2$CH$_2$—(O—CH$_2$CH$_2$—)$_3$O—CH$_2$CH$_2$—, —CH$_2$CH$_2$—(O—CH$_2$CH$_2$—)$_4$O—CH$_2$CH$_2$— or —CH$_2$CH$_2$—S—CH$_2$CH$_2$—.

$C_2$-$C_{18}$Alkenylene is, for example, vinylene, methylvinylene, octenylethylene or dodecenylethylene. Preference is given to $C_2$-$C_8$alkenylene.

Alkylidene having 2 to 20 carbon atoms is, for example, ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. Preference is given to $C_2$-$C_8$alkylidene.

Phenylalkylidene having 7 to 20 carbon atoms is, for example, benzylidene, 2-phenylethylidene or 1-phenyl-2-hexylidene. Preference is given to $C_7$-$C_9$-phenylalkylidene.

$C_5$-$C_8$Cycloalkylene is a saturated hydrocarbon group having two free valencies and at least one ring unit and is, for example, cyclopentylene, cyclohexylene, cycloheptylene or cyclooctylene. Preference is given to cyclohexylene.

$C_7$-$C_8$Bicycloalkylene is, for example, bicycloheptylene or bicyclooctylene.

Unsubstituted or $C_1$-$C_4$alkyl-substituted phenylene is, for example, 1,2-, 1,3-, 1,4-phenylene. 1,4-Phenylene is preferred.

The compounds of the formula V are disclosed in WO-A-06/024611.

Compounds (201)-(247) as examples for compounds of the formula V are of special interest.

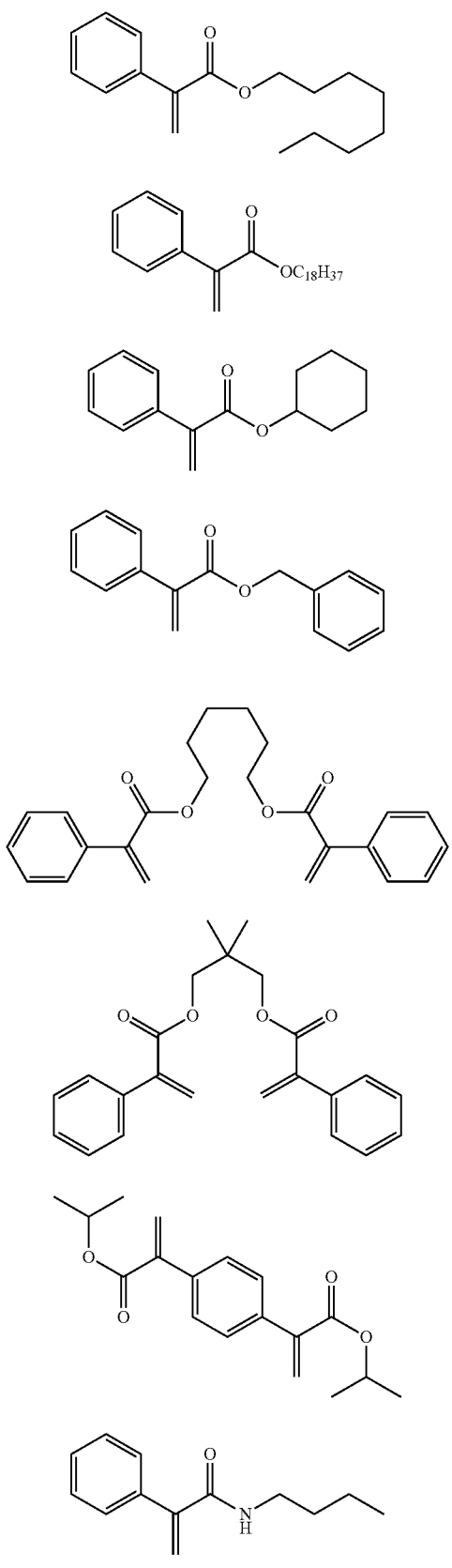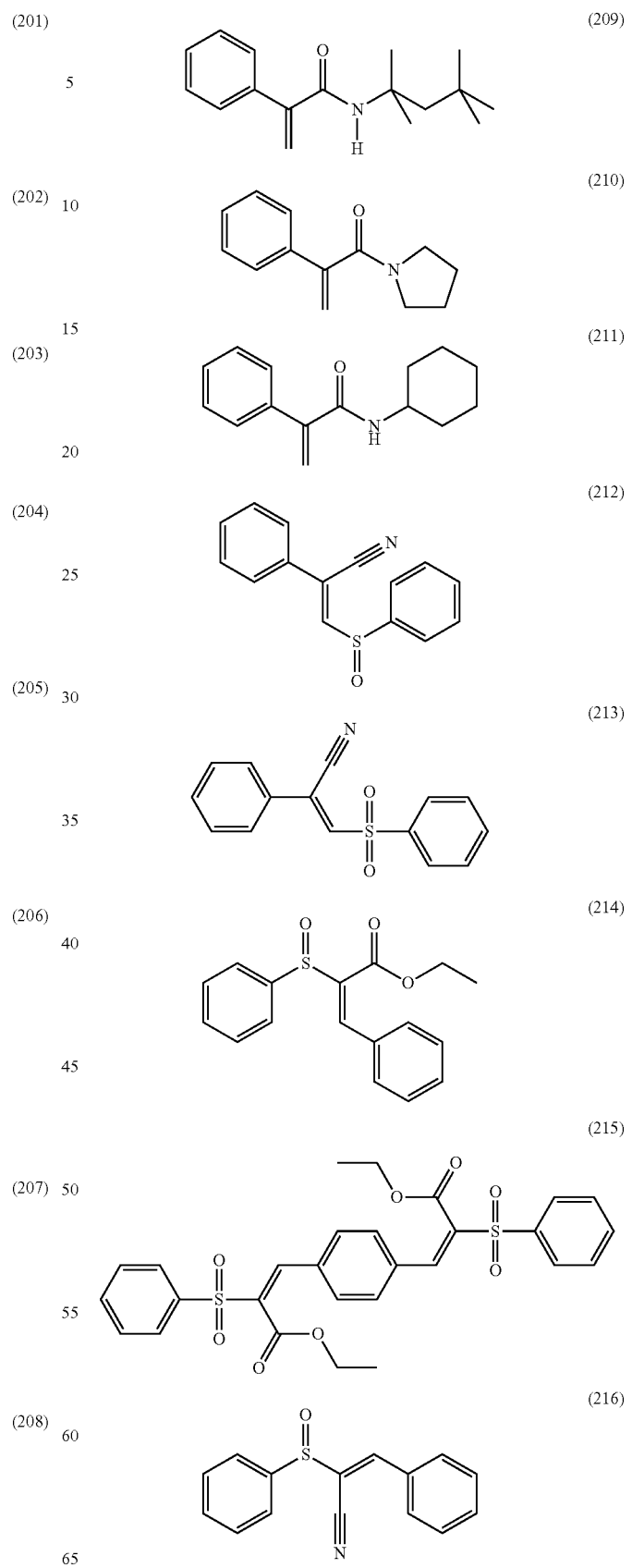

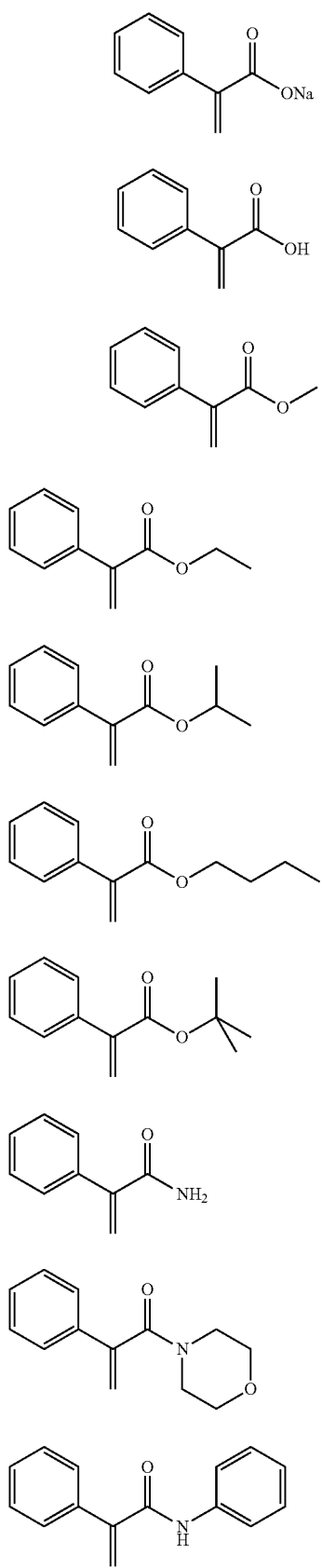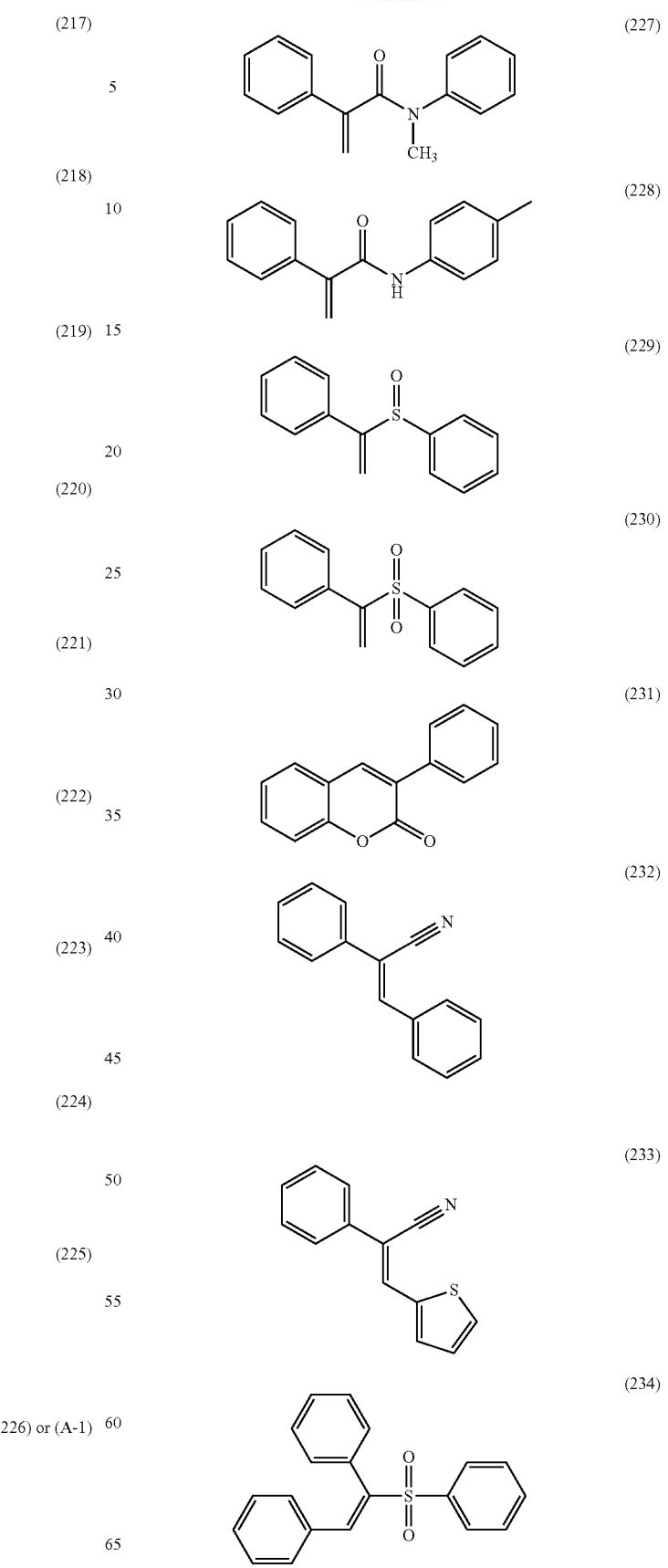

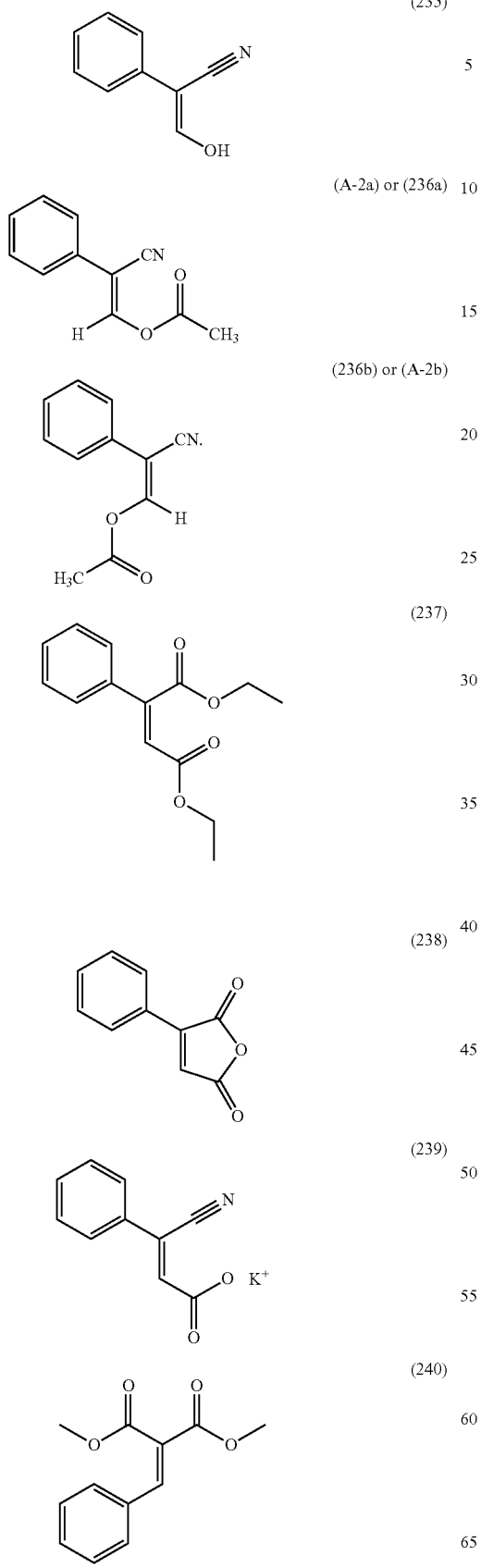
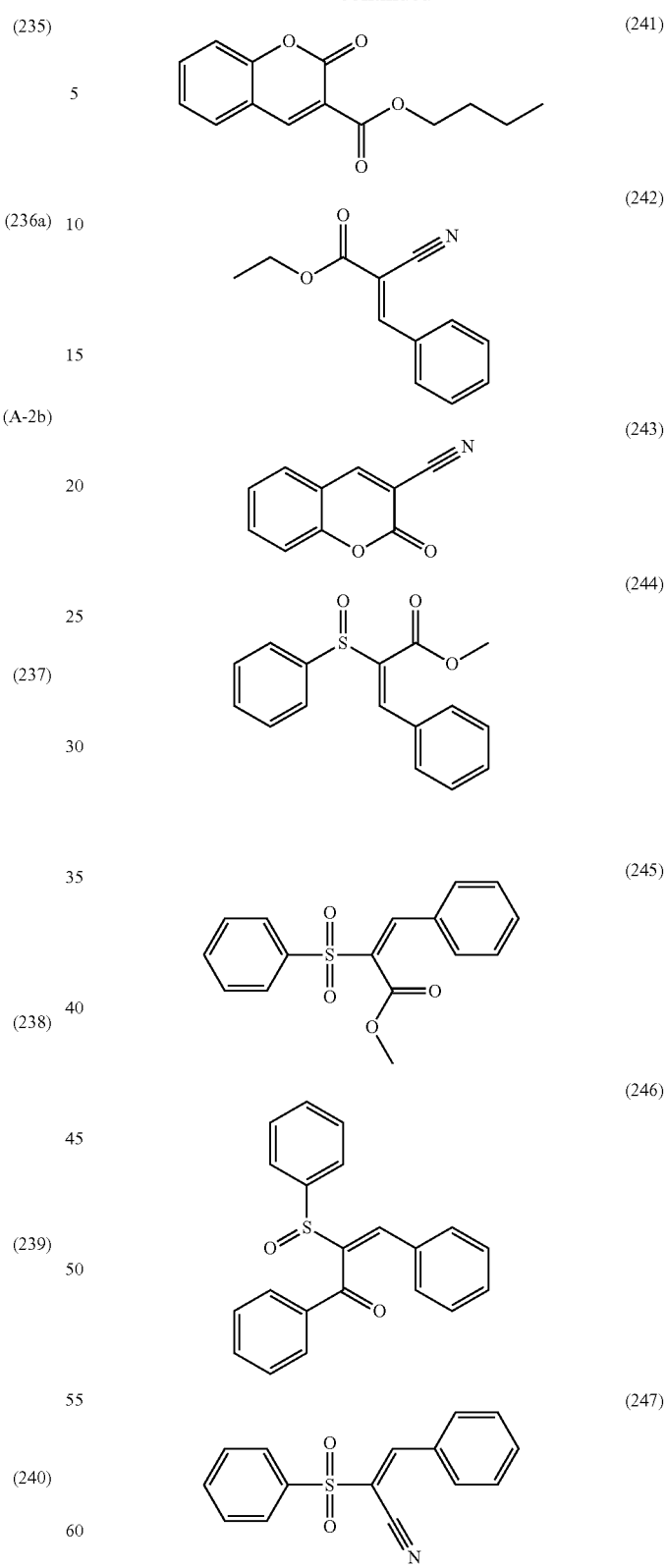
Of interest is a process for reducing the amount of saturated or unsaturated monomers and oligomers during production and processing of styrenic polymers wherein component d) is a compound of the formula A-1, A-2a or A-2b.

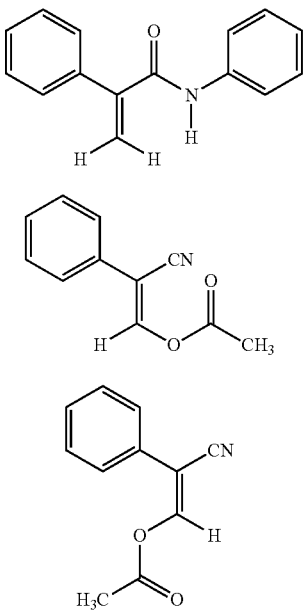

(A-1)

(A-2a)

(A-2b)

An especially preferred component d) is the compound of the formula (248).

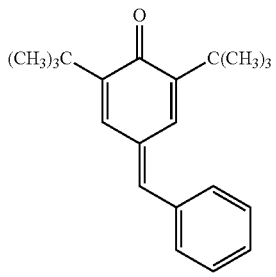

(248)

The mixture of at least two components is preferably present in an amount of 0.001 to 5%, based on the weight of the styrenic polymer.

Preferably, the weight ratio of two components is from 9.9:0.1 to 0.1:9.9, for example 9:1 to 1:9.

Particularly preferred in the process of the invention is a combination of components a) and b).

Of interest is a process for reducing the amount of saturated or unsaturated monomers and oligomers during production and processing of styrenic polymers comprising besides components a), b), c) and d) further additives.

Examples of further additives are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1-yl)phenol, 2,4-dimethyl-6-(1'-methylheptadec-1-yl) phenol, 2,4-dimethyl-6-(1'-methyltridec-1-yl)phenol and mixtures thereof.

1.2. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.3. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

1.4. Alkylidenebisphenols, for example 2, 2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methyllenebis (2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methyl phenyl]terephthalate, 1,1-bis-(3, 5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1, 5,5-tetra-(5-tert-butyl-4-hydroxy-2-methylphenyl)pentane.

1.5. O-, N- and S-benzyl compounds, for example 3, 5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.6. Hydroxybenzylated malonates, for example dioctadecyl-2,2-bis(3,5-di-tert-butyl-2-hyd roxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.7. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3, 5,6-tetramethyl benzene, 2,4,6-tris(3,5-di-tert-butyl-4-hydroxybenzyl)phenol.

1.8. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris(3,5-di-tert-butyl-4-hydroxyphenylethyl)-1,3,5-triazine, 1,3,5-tris(3,5-di-tert-butyl-4-hydroxyphenyl propionyl)-hexahydro-1,3,5-triazine, 1,3,5-tris(3,5-dicyclohexyl-4-hydroxybenzyl)isocyanurate.

1.9. Benzylphosphonates, for example dimethyl-2,5-di-tert-butyl-4-hydroxybenzylphosphonate, diethyl-3,5-di-tert-butyl-4-hydroxybenzyl phosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.10. Acylaminophenols, for example 4-hydroxylauranilide, 4-hydroxystearanilide, octyl N-(3,5-di-tert-butyl-4-hydroxyphenyl)carbamate.

1.11. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.12. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.13. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.16. Ascorbic acid (vitamin C)

1.17. Aminic antioxidants, for example N,N'-di-isopropyl-p-phenylenediamine, N,N'-di-secbutyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1,3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N, N, N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

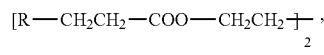

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethane, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydrooxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4- dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxyylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecylalpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilizers, for example melamine, polyvinylpyrrolidone, dicyandiamide, triallyl cyanurate, urea derivatives, hydrazine derivatives, amines, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

12. Other additives, for example plasticisers, lubricants, emulsifiers, pigments, rheology additives, catalysts, flow-control agents, optical brighteners, flameproofing agents, antistatic agents and blowing agents.

Preferred further additives are for example light-stabilizers, acid scavengers and/or antistatic agents.

The mixture of at least two components selected from the group consisting of a) phenol thioethers, b) phenol acrylates, c) 3-arylbenzofuran-2-ones and d) 1,1-di-substituted ethylenes or tri-substituted ethylenes is suitable for reducing the amount of saturated or unsaturated monomers and oligomers during production and processing of styrenic polymers.

Styrenic polymers include, polystyrene, impact polystyrene, styrene-butadiene copolymers, clear impact polystyrene, ABS, MBS, MABS (transparent ABS), SAN, MS (methylmethacrylate-styrene), ASA, AES, ACS, and polymer alloys based on styrenic copolymers and other polymers, especially engineering polymers, e.g. PC/ABS, PC/ASA, unsaturated styrenic polyester, PPE (polyphenylene ether)/PS or PPE/IPS.

A further object of the invention is therefore is also a mixture for reducing the amount of saturated or unsaturated monomers and oligomers during production and processing of styrenic polymers comprising a mixture of at least two components selected from the group consisting of a) phenol thioethers, b) phenol acrylates, c) 3-arylbenzofuran-2-ones and d) 1,1-di-substituted ethylenes or tri-substituted ethylenes; with the proviso that a mixture comprising a component a) and a component b) contains at least a third component selected from the groups c) or d).

Preferred mixtures do not contain a combination of components a) and b).

The mixture of at least two components selected from the group consisting of components a), b), c) and d) and optionally further additives, for example typically those as outlined above, are preferably present in the styrenic polymer in concentrations of 0.001 to 5% based on the weight of said material.

The co-stabilizers are added, for example, in concentrations of from 0.01 to 10%, based on the total weight of the styrenic polymer.

A further object of the invention is therefore also a composition comprising
i) a styrenic polymer, and
ii) an additive mixture of at least two components selected from the group consisting of a) phenol thioethers, b) phenol acrylates, c) 3-arylbenzofuran-2-ones and d) 1,1-di-substituted ethylenes or tri-substituted ethylenes; with the proviso that a mixture comprising a component a) and a component b) contains at least a third component selected from groups c) or d).

Preferred compositions do not contain a mixture comprising components a) and b).

The composition may, for example, comprise besides components (i) and (ii) further additives as outlined above for the process.

The mixture of at least two components selected from the group consisting of components a), b), c) and d) and optionally further additives are incorporated into the styrenic polymer according to known methods, for example before or during polymerization, before or during processing, or alternatively by applying a solution or dispersion of the additive mixture to the styrenic polymer, if necessary with subsequent evaporation of the solvent. The mixture of at least two components selected from the group consisting of components a), b), c) and d) and optionally further additives may also be added to the styrenic polymer in the form of a masterbatch.

The present invention relates therefore also to a masterbatch composition comprising an additive mixture of at least two components selected from the group consisting of a) phenol thioethers, b) phenol acrylates, c) 3-arylbenzofuran-2-ones and d) 1,1-di-substituted ethylenes or tri-substituted ethylenes; with the proviso that a mixture comprising a component a) and a component b) contains at least a third component selected from group c) or d); and a thermoplastic material which is identical or compatible with the styrenic polymer.

Preferably, the masterbatch comprises 10 to 80% by weight of said thermoplastic material.

The mixture of at least two components selected from the group consisting of components a), b), c) and d) and optionally further additives, may also be added before or during polymerization or before processing.

The styrenic polymers stabilized in that manner may be used in an extremely wide variety of forms, e.g. in the form of films, fibres, tapes, moulding compounds or profiles, or as binders for surface-coatings, especially powder coatings, adhesives or cements.

The styrenic polymer prepared according to the present invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article, in particular a film, pipe, profile, bottle, tank or container, fiber containing a composition as described above.

A film is preferred. The film can be prepared as a blown film cast film or via extrusion coating. Especially preferred is a multilayer film.

A further embodiment of the present invention relates to a shaped article containing a composition as described above. The molding is in particular effected by injection, blow, compression, roto-molding or slush-molding or extrusion.

A preferred embodiment of the present invention is likewise the use of a mixture of at least two components selected from the group consisting of a) phenol thioethers, b) phenol acrylates, c) 3-arylbenzofuran-2-ones and d) 1,1-di-substituted ethylenes or tri-substituted ethylenes for reducing the amount of saturated or unsaturated monomers and oligomers during production and processing of styrenic polymers.

The preferred mixtures of at least two components selected from the group consisting of a) phenol thioethers, b) phenol acrylates, c) 3-arylbenzofuran-2-ones and d) 1,1-di-substituted ethylenes or tri-substituted ethylenes for the use of reducing the amount of saturated or unsaturated monomers and oligomers during production and processing of styrenic polymers stabilizer are the same as those described for the process for reducing the amount of saturated or unsaturated monomers and oligomers during production and processing of styrenic polymers.

The following Examples illustrate the invention further. Parts or percentages relate to weight.

EXAMPLE 1

Polystyrene with Reduced Styrene Monomer 0.10% of additive is added to a polystyrene [GPPS grade PG383M supplied by Chimei, Taiwan] and mixed in a Henschel mixer. The mixture is then extruded on a single screw extruder (Göttfert GmbH) at temperature at most 220° C. The obtained polystyrene pellets are then fed into an injection molding machine (Engel Gmbh), kept in the cylinder for 10 minutes at 250° C. before the injection. The styrene monomer content of the obtained plaques is measured by HPLC/UV. The results are summarized in Table 3.

TABLE 3

| Example | Additive | Remaining styrene monomer |
|---|---|---|
| 1a[a)] | 0.10% of Compound B-1[c)] | 718 |
| 1b[a)] | 0.10% of Irganox 3052[d)] | 772 |
| 1c[a)] | 0.10% of Irganox 1726[e)] | 759 |
| 1d[a)] | 0.10% of Acrylamide A-1[f)] | 746 |
| 1e[a)] | 0.10% of Acrylcyanoester A-2[g)] | 728 |
| 1f[b)] | 0.05% of Irganox 1726[e)] 0.05% of Irganox 3052[d)] | 708 |
| 1g[b)] | 0.05% of Irganox 1726[e)] 0.05% of Compound B-1[c)] | 694 |
| 1h[b)] | 0.05% of Irganox 1726[e)] 0.05% of Acrylamide A-1[f)] | 729 |
| 1i[b)] | 0.05% of Irganox 1726[e)] 0.05% of Acrylcyanoester A-2[g)] | 713 | a) Comparative Example.

b) Example according to the invention.

c) Compound B-1 is a 3-arylbenzofuran-2-one of the following formula:

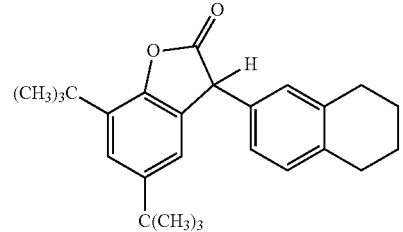

(B-1)

d) Irganox 3052 (RTM, Ciba Inc.) is a phenol acrylate of the following formula:

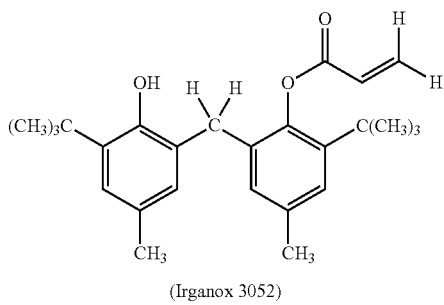 [SMILES: C=CC(=O)Oc1c(Cc2cc(C)cc(C(C)(C)C)c2O)cc(C)cc1C(C)(C)C]

(Irganox 3052)

e) Irganox 1726 (RTM, Ciba Inc.) is a phenol thioether of the following formula:

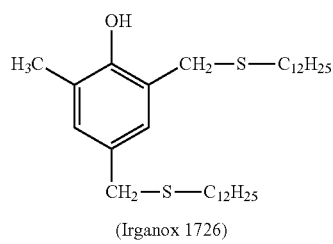

(Irganox 1726)

f) Acrylamide A-1 is a 1,1-disubstituted ethylene of the following formula:

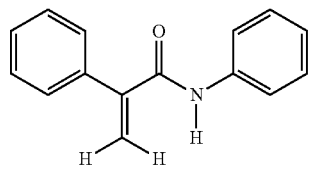

(A-1)

g) Acrylcyanoester A-2 is an isomeric mixture of a tri-substituted ethylene of the following formula:

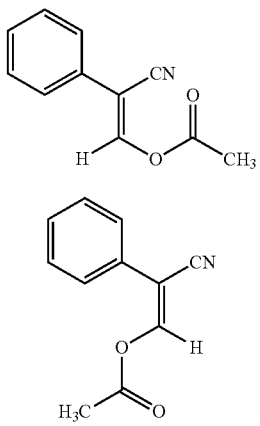

(A-2a)

(A-2b)

What is claimed is:

1. A process for reducing the amount of saturated or unsaturated monomers and oligomers during production and processing of styrenic polymers,
   which process comprises adding to the styrenic polymers an additive mixture comprising at least two components selected from the group consisting of a) phenol thioethers, b) phenol acrylates, c) 3-arylbenzofuran-2-ones and d) 1,1-di-substituted ethylenes or tri-substituted ethylenes,
   with the proviso that a mixture comprising a component a) and a component b) contains a third component selected from the group consisting of c) and d).

2. A process according to claim 1, wherein the additive mixture comprises component a) a compound of formula I

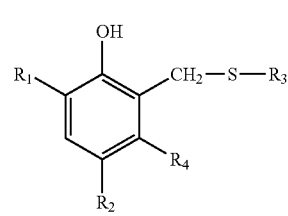

(I)

wherein
$R_1$ is hydrogen, $C_1$-$C_{20}$alkyl, styryl, α-methyl-styryl or —$CH_2$—S—$R_3$; or $C_1$-$C_{20}$alkyl substituted with $C_2$-$C_{20}$alkenyl, $C_3$-$C_{20}$alkinyl, $C_5$-$C_9$cycloalkyl, phenyl or tolyl;
$R_2$ is $C_1$-$C_{20}$alkyl or —$CH_2$—S—$R_3$,
$R_3$ is $C_1$-$C_{20}$alkyl; $C_1$-$C_{20}$alkyl substituted with phenyl, hydroxyl, cyano, formyl, acetyl or —O—CO—$R_5$; $C_2$-$C_{20}$alkenyl, $C_3$-$C_{20}$alkinyl, $C_5$-$C_9$cycloalkyl; or $C_5$-$C_9$cycloalkyl substituted with hydroxyl, phenyl, 4-chlorophenyl, 2-methoxycarbonylphenyl, p-tolyl, 1,3-benzthiazol-2-yl, —(CHR$_5$)$_n$COOR$_6$ or —(CHR$_5$)$_n$CONR$_7$R$_8$;
$R_4$ is hydrogen or methyl,
$R_5$ is hydrogen or $C_1$-$C_6$alkyl,
$R_6$ is $C_1$-$C_{20}$alkyl; $C_3$-$C_{20}$alkyl interrupted with oxygen or sulfur; $C_5$-$C_9$cycloalkyl, phenyl, benzyl or tolyl,
$R_7$ and $R_8$ are independently of each other hydrogen or $C_1$-$C_6$alkyl, and
n is 1 or 2.

3. A process according to claim 1, wherein the additive mixture comprises component b) a compound of formula II

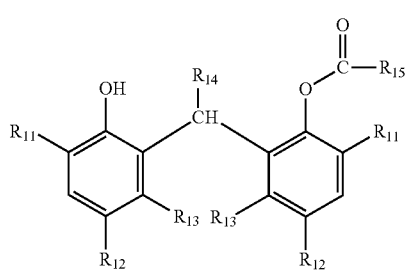

(II)

wherein
$R_{11}$ and $R_{12}$ are each independently of the other $C_1$-$C_{25}$alkyl; $C_5$-$C_{12}$cycloalkyl unsubstituted or substituted by $C_1$-$C_4$alkyl; $C_7$-$C_9$phenylalkyl; or phenyl unsubstituted or substituted by $C_1$-$C_4$alkyl, $R_{13}$ is hydrogen or methyl, $R_{14}$ is hydrogen or $C_1$-$C_8$alkyl, $R_{15}$ is $C_1$-$C_{25}$alkyl; $C_2$-$C_{25}$alkyl interrupted by oxygen, sulfur or

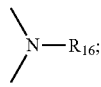

$C_2$-$C_{24}$alkenyl;

$C_8$-$C_{30}$phenylalkenyl unsubstituted or substituted on the phenyl ring by halogen, $C_1$-$C_4$alkyl, $C_1$-$C_4$alkoxy or $C_1$-$C_4$alkylthio; $C_5$-$C_{12}$cycloalkyl unsubstituted or substituted by $C_1$-$C_4$alkyl;

$C_8$-$C_{30}$phenylalkyl unsubstituted or substituted on the phenyl ring by halogen, $C_1$-$C_4$alkyl, $C_1$-$C_4$alkoxy or $C_1$-$C_4$alkylthio; or phenyl unsubstituted or substituted by halogen, $C_1$-$C_4$alkyl, $C_1$-$C_4$alkoxy or $C_1$-$C_4$alkylthio, and $R_{16}$ is hydrogen or $C_1$-$C_{18}$alkyl.

4. A process according to claim 1, wherein the additive mixture comprises component c) a compound of formula III

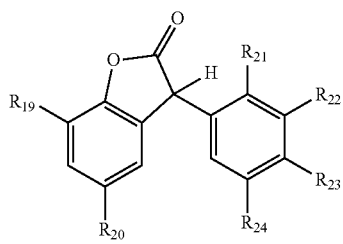

(III)

wherein $R_{19}$ is hydrogen or $C_1$-$C_8$alkyl, $R_{20}$ is $C_1$-$C_{12}$alkyl, $R_{21}$ is hydrogen, $C_1$-$C_4$alkyl or $C_2$-$C_8$alkanoyl, $R_{22}$ is hydrogen or $C_1$-$C_8$alkyl; or $R_{21}$ and $R_{22}$ or $R_{22}$ and $R_{23}$ together with the carbon atoms to which they are attached form a $C_6$-$C_8$cycloalkylene ring, $R_{23}$ is hydrogen, $C_1$-$C_4$alkyl or $C_1$-$C_4$alkoxy, and $R_{24}$ is hydrogen or $C_1$-$C_{12}$alkyl.

5. A process according to claim 1, wherein the additive mixture comprises component d) a compound of formula A-1, A-2a or A-2b

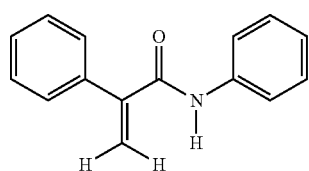

(A-1)

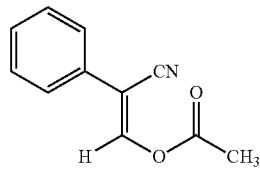

(A-2a)

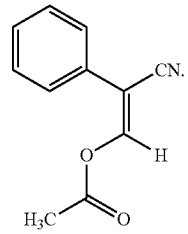

(A-2b)

6. A process according to claim 1, comprising adding further additives.

7. A process according to claim 6, wherein the further additives are light stabilizers, acid scavengers and/or antistatic agents.

8. A process according to claim 1, wherein the mixture of at least two components is added in an amount of from 0.001 to 5%, based on the weight of the styrenic polymer.

9. A mixture for reducing the amount of saturated or unsaturated monomers and oligomers during production and processing of styrenic polymers, comprising at least two components selected from the group consisting of a) phenol thioethers, b) phenol acrylates, c) 3-arylbenzofuran-2-ones and d) 1,1-di-substituted ethylenes or tri-substituted ethylenes; with the proviso that a mixture comprising a component a) and a component b) contains a third component selected from the group consisting of c) and d).

10. A mixture according to claim 9 with the proviso that a mixture comprising a component a) and component b) is excluded.

11. A composition comprising
i) a styrenic polymer, and
ii) an additive mixture comprising at least two components selected from the group consisting of a) phenol thioethers, b) phenol acrylates, c) 3-arylbenzofuran-2-ones and d) 1,1-di-substituted ethylenes or tri-substituted ethylenes; with the proviso that a mixture comprising a component a) and a component b) contains a third component selected from the group consisting of c) and d).

12. A composition according to claim 11 which does not contain a mixture comprising a component a) and a component b).

13. A composition according to claim 11 comprising further additives.

14. A masterbatch composition comprising an additive mixture according to claim 9 and a thermoplastic material which is identical or compatible with the styrenic polymer.

15. A masterbatch composition according to claim 14 comprising 10 to 80% by weight of said thermoplastic material.

16. A shaped article containing a mixture according to claim 9.

17. A composition according to claim 12 comprising further additives.

18. A masterbatch composition comprising an additive mixture according to claim 10 and a thermoplastic material which is identical or compatible with the styrenic polymer.

19. A masterbatch composition according to claim 18 comprising 10 to 80% by weight of said thermoplastic material.

20. A shaped article containing a mixture according to claim 10.

\* \* \* \* \*